United States Patent
Polic et al.

(10) Patent No.: US 6,330,930 B1
(45) Date of Patent: Dec. 18, 2001

(54) RECEPTACLE FOR SOUND-DAMPING ACCOMMODATION OF A UNIT WHICH CAN BE INSTALLED IN A MOTOR VEHICLE

(75) Inventors: Marko Polic, Sindelfingen; Günther Weikert, Aidlingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/647,824
(22) PCT Filed: Mar. 26, 1999
(86) PCT No.: PCT/EP99/02078
§ 371 Date: Dec. 1, 2000
§ 102(e) Date: Dec. 1, 2000
(87) PCT Pub. No.: WO99/52742
PCT Pub. Date: Oct. 21, 1999

(30) Foreign Application Priority Data

Apr. 8, 1998 (DE) .............................................. 198 15 706

(51) Int. Cl.[7] ........................................................ F01N 1/10
(52) U.S. Cl. .......................................... 181/204; 181/202
(58) Field of Search .................................... 181/200, 202, 181/204, 207, 208; 62/296; 165/69; 123/198 E

(56) References Cited

U.S. PATENT DOCUMENTS 3,882,951 * 5/1975 Conley .................................. 181/204
4,914,929 * 4/1990 Shimazaki ........................... 181/202

* cited by examiner

Primary Examiner—Khanh Dang
(74) Attorney, Agent, or Firm—Kenyon & Kenyon

(57) ABSTRACT

A container for the noise-muffling accommodation of a unit to be installed in a vehicle, such as an electric motor, a pneumatic pump or the like, has two container parts. Each container part is formed by a foam part and is fitted together to form a closed housing. The housing is adapted to be clipped to a vehicle bodywork for assembly on neighbouring parts of the vehicle. A U-shaped holder is partially integrated into one container part. The U-shaped holder is foamed in place. The legs of the U-shaped holder each have a clipping member on mutually opposite wall parts of the container supporting it. The clipping members extend beyond the aperture edge of the container part to clip together the two container parts. A flange projects outwardly from the container walls to secure the container in a gap in the bodywork. Each flange, on its side remote from the respective clipping member, has at least one supporting shoulder projecting laterally outwardly from the container part. The shoulder is moulded onto a spring tongue cut out of the leg of the U. The shoulder, when the container is installed, is supported on a marginal part of the bodywork gap located between the flange and the supporting shoulder.

8 Claims, 3 Drawing Sheets

RECEPTACLE FOR SOUND-DAMPING ACCOMMODATION OF A UNIT WHICH CAN BE INSTALLED IN A MOTOR VEHICLE

CROSS-REFERENCE TO RELATED APPLICATIONS

This application is the national phase filing of PCT/EP99/02078 filed Mar. 26, 1999, which claims priority to German Patent Application 198 15 706.1 filed Apr. 8, 1998, which applications are herein expressly incorporated by reference.

BACKGROUND OF THE INVENTION

The invention relates to a container for the noise-muffling accommodation of a unit to be installed in a vehicle, such as an electric motor, pneumatic pump or the like, which includes two container parts. Each part is formed by foam parts and fitted together to form a closed housing. The parts can be clipped to the vehicle bodywork for assembly on neighbouring parts of the vehicle.

Units to be installed in vehicles, such as pneumatically operating pumps, electric motors, hydraulic units and the like, which generate relatively loud operational noises during operation, are to be vibrationally decoupled from the carriers that accommodate them, for example bodywork parts of a motor vehicle, in order at least substantially to eliminate the transmission of body noise and significantly minimize airborne noise.

For this purpose, it is known to embed such units in a container made from foamed plastic of at least two parts. The container is secured in the vehicle by being permanently clamped, latched or snap-fitted to or clipped into adjacent vehicle parts (DE 44 22 384 A1).

SUMMARY OF THE INVENTION

The object of the present invention is to provide a container that can be securely closed and secured in the vehicle without the need for separate closure and securing members.

This object is achieved, according to the invention, by a U-shaped holder which is partially integrated into one container part foamed in place. The legs of the U of the holder each have a clipping member on mutually opposite wall parts of the container part to support it. The legs extend beyond the aperture edge of the latter to clip together the two container parts. A flange projects outwards from these wall parts to secure the container in a gap in the bodywork. At least one supporting shoulder projects laterally outward from the container part flange on its side remote from the respective clipping member. The supporting shoulder is moulded on to a spring tongue cut out of the leg of the U. The supporting shoulder, when the container is installed, is supported on a marginal part of the bodywork gap located between the flange and the supporting shoulder.

The provision of the holder arranged on one container part and its simultaneous equipment with the legs of a U serving to clip the two container parts together enables the simplest possible container handling, both for opening and closing the container and for its installation and removal, the only means necessary for these purposes being the provision of a U-shaped holder integrated into one container part.

Accordingly, the design according to the invention makes it possible also to manage with a small number of individual parts and part numbers. An important advantage in terms of weight can be achieved here if the container is formed by a rigid plastic component which is preferably injection-moulded from fibre glass reinforced nylon (nylon 6).

In order to be able to dispense, when inserting the container in the gap in the bodywork, with the need to press the spring tongues manually inwards to clip the container on the bodywork, it is advantageous to form the supporting shoulders of the legs of the U with a wedge-shaped taper in the direction opposite to the adjacent flange.

Designing the supporting shoulders in such a way that the supporting shoulders are each formed by numerous webs moulded onto the spring tongues of the legs of the U with lateral spacing, offers the advantage of economizing on plastic.

An effective, automatic securing of the container lid in its closed position can advantageously be achieved if the clipping members possess an engagement member at the free end extending at right angles towards the container part to be clipped. The engagement member engages over a supporting shoulder moulded into the adjacent wall part of this container part.

It is advantageous here if the engagement member forms one leg of an end piece of the clipping members which is of V-shaped cross-sectional design. The other leg of the clipping members projects over the wall part of the container, and if the supporting shoulder of the container part to be clipped forms a wall part of a recess of this container part, which is likewise approximately V-shaped in cross section, and into which the engagement member can be latched with positive locking.

In a further, advantageous embodiment of the invention, it is finally proposed to design the container parts in such a way that they form, in the clipped-together state, a cuboid container and that the holder of U-shaped cross section is provided on one container part in a manner such that the clipping members of the legs of its U in each case extend on one of its long wall parts beyond its aperture edge.

From the following detailed description, taken in conjunction with the drawings and subjoined claims, other objects and advantages of the present invention will become apparent to those skilled in the art.

BRIEF DESCRIPTION OF THE DRAWINGS

Further advantages and details of the invention will be apparent from the attached description of an example of embodiment of the invention shown in the drawing, in which.

DETAILED DESCRIPTION OF THE PREFERRED EMBODIMENT

Figure 1:
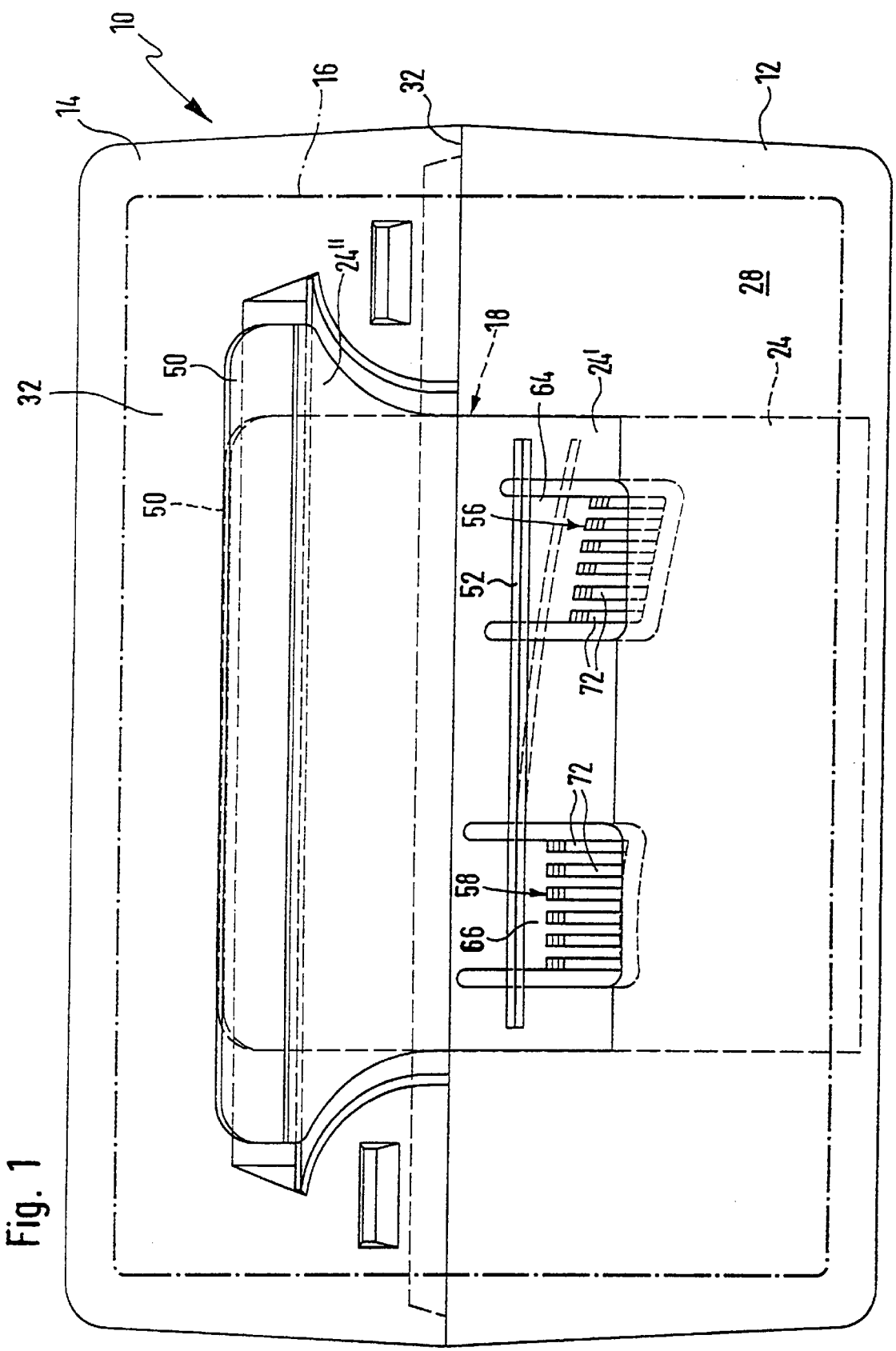
FIG. 1 is a lateral view of the container.
Figure 2:
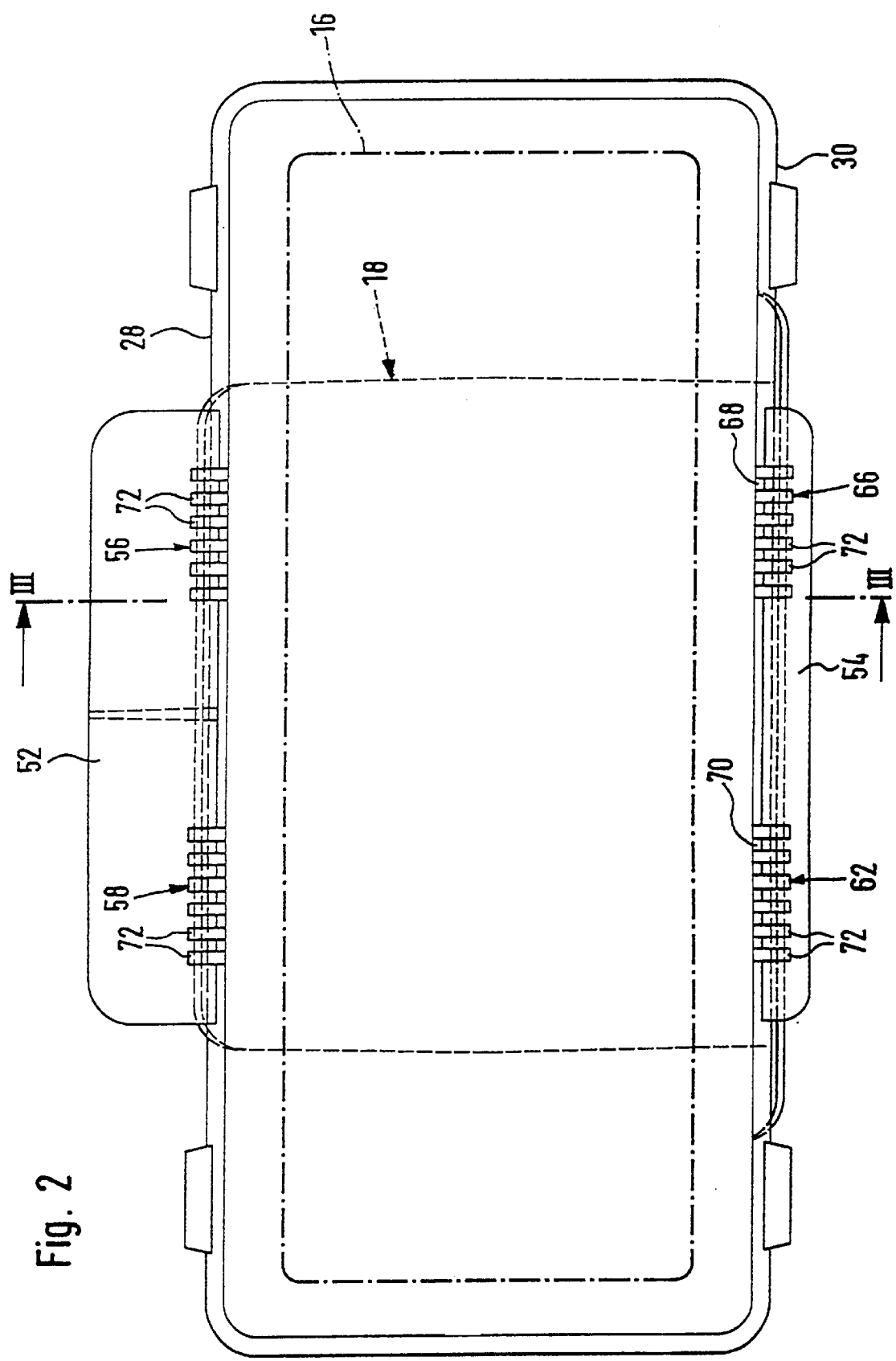
FIG. 2 is a view of the container from below.

The container 10 shown in the drawing, preferably of cuboid design, forms an item of equipment, for example, for motor vehicles for the noise-muffling installation of an auxiliary unit into the vehicle bodywork. The reference 12 designates an underpart of the container and 14 a container lid, both of which includes foamed mouldings, reconstituted foam chips, preferably consisting of polyurethane (PUR), having been selected as the material.

The two container parts 12, 14 are preferably trough-shaped and of almost identical dimensions, engaging with one another at the edges by positive fitting when the container 10 is closed so that the underpart 12 of the container and container lid 14 are each precisely oriented with the other.

The container design depends on the three-dimensional shape of the unit to be accommodated in the container 10 for the purposes of noise muffling or vibrational decoupling from the bodywork. In the present case, for example, the container is to accommodate a cuboid air pump 16 for the vehicle's central locking system, indicated in broken lines.

The underpart 12 of the container and/or container lid 14 is preferably pierced through the end face by at least one aperture in order to be able to connect the air pump 16 to connecting lines. For the sake of simplicity, no such aperture in the wall has been shown.

Figure 3:
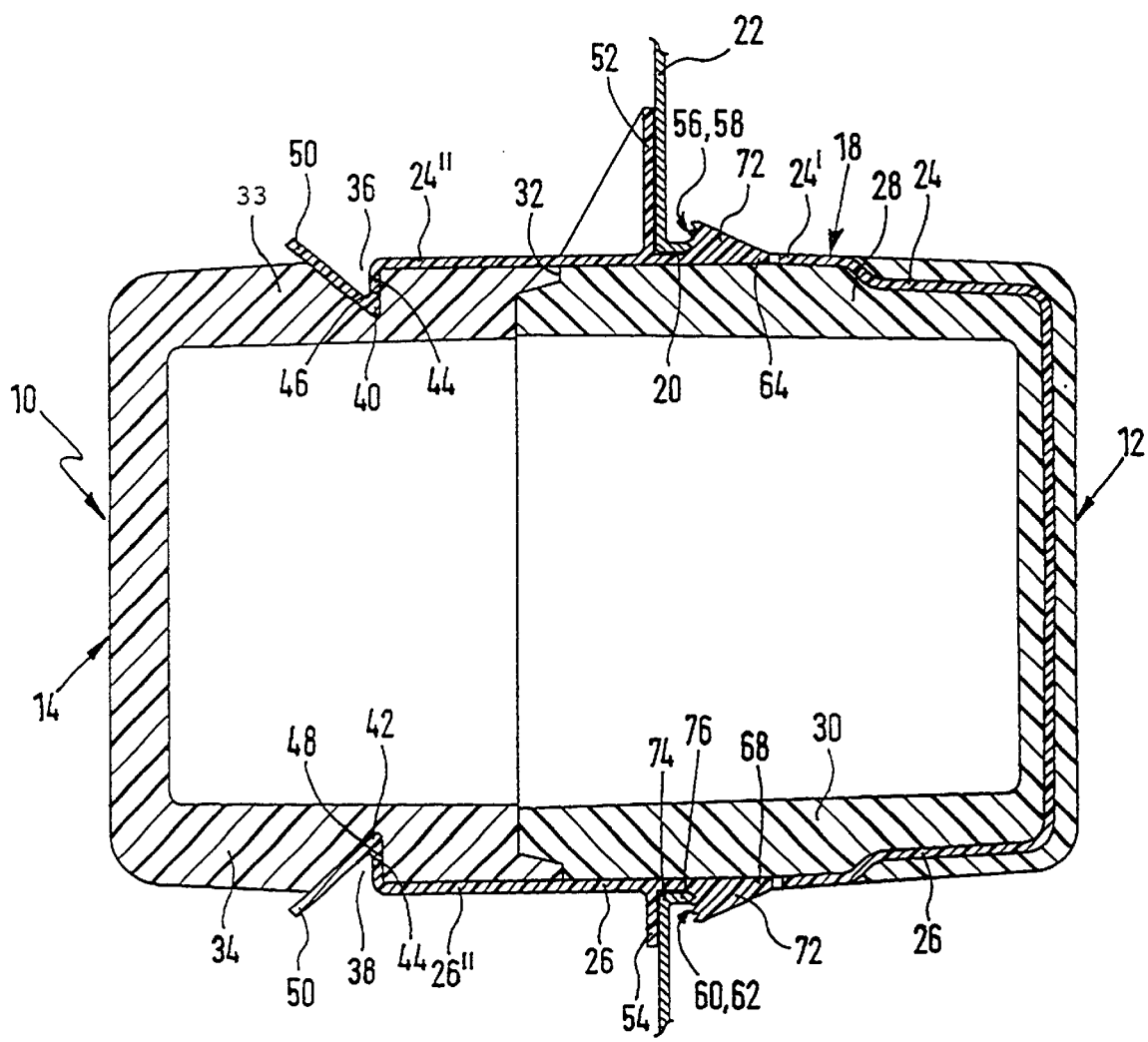
FIG. 3 is a container cross section along the line III—III in FIG. 2.

The reference 18 designates, as an entity, a holder by means of which both the container lid 14 on the underpart 12 of the container and the container 10 as a whole are to be securable by clipping, for example in an aperture 20 in a bodywork part 22 (see FIG. 3).

This holder 18 is preferably of U-shape design and, for example, partially integrated in the underpart 12 of the container by being foamed in place. The legs 24 and 26 of the U of the holder preferably are located on the long wall parts 28, 30 of the underpart 12 of the container.

Each leg 24, 26 of the U is slightly angled outwards so that, over a part 24' and 26' respectively of its length it fits flush with the outside of the long wall part in question, 28 and 30 respectively, and forms a clipping member 24" and 26" respectively, which extends beyond the aperture edge 32 of the underpart 12 of the container.

The holder 18 is preferably formed by a moulding made from a duroplastic, preferably nylon 6. The free leg parts 24', 26' forming the clipping members 24", 26" are able to be resiliently spread relative to one another to allow the container lid 14 to be placed on the underpart 12 of the container. In the closed position of the container lid 14, by contrast, the clipping members 24", 26" automatically latch with positive fitting into recesses 36 and 38 respectively in the corresponding long wall parts 33 and 34 of the lid (see FIG. 3).

For this purpose, the parts of the preferably relatively widely designed legs 24, 26 of the U, forming the two clipping members 24", 26", each have at the free end an engagement member 40 and 42, respectively, which snap-fits into the corresponding recess 36 and 38, respectively. These project with one part from the long wall part 33 and 34 respectively of the lid, so that the engagement members 40, 42 can be manually disengaged from the container lid 14 in order to open the container 10. The engagement members 40, 42 are preferably of V-shaped crosssectional design, one leg 44 of the V extending perpendicularly from the end piece of the clipping member 24" and 26" respectively towards the wall part 33 and 34 respectively of the lid and engaging over a supporting shoulder 46 and 48 respectively moulded into this wall part, while the other leg 50 of the V forms a grip for disengaging the engagement members 40, 42 by projecting sufficiently far out of the recess 36 and 38 respectively.

For the releasable clipping of the container 10 into the gap 20 in the bodywork part 22, the parts 24', 26' of the legs of the holder 18 are each equipped with a moulded-on supporting flange 52, 54 projecting outwards and downwards therefrom. To each of these are assigned externally and at a distance from their flange side remote from the clipping member 24" and 26", respectively, preferably two supporting shoulders 56, 58 and 60, 62, respectively, which are provided side by side and at a distance apart. The latter are in each case moulded onto a spring tongue 64, 66 cut away in the leg part 24' and 26', respectively, and are preferably each formed by numerous webs 72 arranged side by side and at a distance apart. These webs 72 taper in a wedge-shaped manner in the opposite direction to the adjoining supporting shoulder 56, 58 and 60, 62 respectively. The web arrangement makes it possible to economize on plastic and hence on weight and to keep friction correspondingly low during clipping.

When the container 10 is clipped into the gap 20, the webs 72 of the supporting shoulders 56, 58, 60 and 62 slide on the edge 74 of the gap. The spring tongues 64, 66, 68 and 70 carrying them are being diverted inwards into the foam material of the underpart 12 of the container and prestressed. After they have passed through, the spring tongues 64, 66, 68 and 70 snap back into their normal position, the webs 72 form the supporting shoulders 56, 58 and 60, 62, respectively, preferably engaging behind a beaded edge part 76 of the gap 74. This ensures a clearance-free seating of the container 10 in the bodywork part 22.

As indicated in broken line in FIG. 1, the supporting flanges 52, 54 may also have a design differing from the flat formation to enable them to be brought to bear with positive fitting on a correspondingly shaped bodywork part 22.

It is also clear that the design of the container 10 and of the holder 18 and the type of secure clipping of the two container parts 12, 14 to one another may also be provided in a different manner. The only essential thing is that the holder 18 is integrated into one of the two container parts 10, 12 and the clipping actions as explained above can be performed by means of the holder.

While the above detailed description describes the preferred embodiment of the present invention, the invention is susceptible to modification, variation and alteration without deviating from the scope and fair meaning of the subjoined claims.

What is claimed is:

1. A container for the noise-muffling accommodation of a unit to be installed in a vehicle, such as an electric motor, pneumatic pump or the like, comprising:

two container parts, each container part formed by foam parts and fitted together to form a closed housing, said housing adapted to be clipped to the vehicle bodywork for assembly on neighbouring parts of the vehicle;

a U-shaped holder being partially integrated into one container part, said U-shaped holder being foamed in place, legs of the U of the holder each have a clipping member on mutually opposite wall parts of the container part supporting it, the clipping member extends beyond the aperture edge of the container part for clipping together the two container parts, a flange projects outwards from the container for securing the container in a gap in the bodywork, each flange, on its side remote from the respective clipping member, includes at least one supporting shoulder projecting laterally outward from the container part and said shoulder moulded on to a spring tongue cut out of the leg of the U, said supporting shoulder, when the container is installed, being supported on a marginal part of the bodywork gap located between the flange and the supporting shoulder.

2. The container according to claim 1, wherein the container is formed by a rigid plastic component.

3. The container according to claim 2, wherein the holder is injection-moulded from fibre glass-reinforced nylon.

4. The container according to claim 1, wherein the supporting shoulders of the legs of the U are designed with a wedge-shaped taper in the direction opposite to the adjacent flange.

5. The container according to claim 4, wherein the supporting shoulders are each formed by numerous webs moulded onto the spring tongues of the legs of the U with lateral spacing.

6. The container according to claim 1, wherein the clipping members possess an engagement member at the free end extending at right angles towards the container part to be clipped, said engagement member engages over a supporting shoulder moulded into the adjacent wall part of this container part.

7. The container according to claim 6, wherein the engagement member forms one leg of an end piece of the clipping members which is of V-shaped cross-sectional design, the other leg of the clipping members projecting over the wall part and the supporting shoulder of the container part to be clipped forms a wall part of a recess of this container part which is likewise approximately V-shaped in cross section and into which the engagement member can be latched with positive locking.

8. The container according to claim 1, wherein the two container parts in the clipped-together state form a cuboid container and in that the holder of U-shaped cross section is provided on one container part in a manner such that the clipping members of the legs of its U in each case extend on one of its long wall parts beyond its aperture edge.

* * * * *